(12) United States Patent
Zeng et al.

(10) Patent No.: US 12,373,618 B2
(45) Date of Patent: Jul. 29, 2025

(54) ADAPTIVE SIMULATION IN ADDITIVE MANUFACTURING

(71) Applicant: Peridot Print LLC, Palo Alto, CA (US)

(72) Inventors: Jun Zeng, Palo Alto, CA (US); Carlos Alberto Lopez Collier de la Marliere, Guadalajara (MX); He Luan, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 601 days.

(21) Appl. No.: 17/415,095

(22) PCT Filed: Jul. 19, 2019

(86) PCT No.: PCT/US2019/042608
§ 371 (c)(1),
(2) Date: Jun. 17, 2021

(87) PCT Pub. No.: WO2021/015714
PCT Pub. Date: Jan. 28, 2021

(65) Prior Publication Data
US 2022/0171903 A1    Jun. 2, 2022

(51) Int. Cl.
*G06F 30/23* (2020.01)
*B29C 64/393* (2017.01)
(Continued)

(52) U.S. Cl.
CPC .............. *G06F 30/23* (2020.01); *G06F 30/20* (2020.01); *G06F 30/27* (2020.01); *B29C 64/393* (2017.08);
(Continued)

(58) Field of Classification Search
CPC ...... G06F 30/23; G06F 30/27; G06F 2113/10; G06F 2119/08; G06F 30/20; G06N 3/08;
(Continued)

(56) References Cited

U.S. PATENT DOCUMENTS 7,685,738 B2    3/2010  Jones
9,656,427 B2    5/2017  Griszbacher
(Continued)

FOREIGN PATENT DOCUMENTS

CN    105328906 A    2/2016
CN    106383956 A  * 2/2017  ............. G06Q 50/06
(Continued)

OTHER PUBLICATIONS

Lambrakos, S.G. & Cooper, K.P. "A General Algorithm for Inverse Modeling of Layer-by-Layer Liquid-Metal Deposition" J. Materials Engineering & Performance, vol. 19(3), pp. 314-324 (2010) (Year: 2010).*

(Continued)

*Primary Examiner* — Jay Hann
(74) *Attorney, Agent, or Firm* — Shook, Hardy & Bacon L.L.P.

(57) ABSTRACT

Systems and methods for adapting a boundary condition of a simulation of 3D manufacturing are provided. The simulation of 3D manufacturing is based on thermal sensor data from a thermal sensor at a point of a build enclosure are provided.

13 Claims, 6 Drawing Sheets

(51) Int. Cl.
- *B33Y 50/00* (2015.01)
- *G06F 30/20* (2020.01)
- *G06F 30/27* (2020.01)
- *G06F 113/10* (2020.01)
- *G06F 119/08* (2020.01)

(52) U.S. Cl.
CPC ........... *B33Y 50/00* (2014.12); *G06F 2113/10* (2020.01); *G06F 2119/08* (2020.01)

(58) Field of Classification Search
CPC ......... G06N 20/10; B22F 10/28; B22F 10/80; B22F 2999/00; B22F 12/90; B22F 2203/11; B33Y 30/00; B33Y 50/00; B29C 64/393
See application file for complete search history.

(56) References Cited

U.S. PATENT DOCUMENTS

| | | | |
|---|---|---|---|
| 9,662,840 B1 * | 5/2017 | Buller | G06F 30/00 |
| 10,073,424 B2 | 9/2018 | Lin et al. | |
| 10,266,442 B2 | 4/2019 | Klein et al. | |
| 2016/0184893 A1 | 6/2016 | Dave et al. | |
| 2017/0120537 A1 | 5/2017 | DeMuth et al. | |
| 2017/0129184 A1 | 5/2017 | Buller et al. | |
| 2017/0252817 A1 | 9/2017 | Mykulowycz et al. | |
| 2018/0104742 A1 | 4/2018 | Kottilingam et al. | |
| 2018/0111320 A1 | 4/2018 | Zhao et al. | |
| 2018/0133971 A1 | 5/2018 | Vilajosana et al. | |
| 2018/0207876 A1 | 7/2018 | Querol et al. | |
| 2018/0275636 A1 | 9/2018 | Zhao et al. | |
| 2018/0349530 A1 | 12/2018 | Antoine et al. | |
| 2019/0056717 A1 * | 2/2019 | Kothari | B22F 10/37 |
| 2019/0118258 A1 * | 4/2019 | Sachs | B29C 64/393 |
| 2019/0126606 A1 | 5/2019 | Fornos et al. | |

FOREIGN PATENT DOCUMENTS

| | | | | |
|---|---|---|---|---|
| CN | 106383968 A | | 2/2017 | |
| CN | 107368642 A | * | 11/2017 | ............. G06F 30/23 |
| CN | 107530976 A | | 1/2018 | |
| CN | 107580545 A | | 1/2018 | |
| CN | 107848201 A | | 3/2018 | |
| CN | 108698322 A | | 10/2018 | |
| CN | 108883575 A | * | 11/2018 | ........... B29C 64/393 |
| CN | 109145453 A | * | 1/2019 | ............. G06F 30/23 |
| CN | 109284524 A | * | 1/2019 | ............. G06F 30/17 |
| DE | 102015011013 A1 | | 2/2016 | |
| EP | 3208077 A1 | | 8/2017 | |
| TW | 201533078 A | | 9/2015 | |
| WO | WO 2016201390 A1 | * | 12/2016 | ............. G01N 25/04 |
| WO | WO-2017012663 A1 | | 1/2017 | |
| WO | 2017/035228 A1 | | 3/2017 | |
| WO | 2017/044833 A1 | | 3/2017 | |
| WO | WO-2017184002 A1 | | 10/2017 | |
| WO | WO 2017194113 A1 | * | 11/2017 | ............. B29C 70/32 |
| WO | WO 2018052487 A1 | * | 3/2018 | ............. G06F 30/20 |
| WO | WO-2019070250 A1 | | 4/2019 | |
| WO | 2019/117886 A1 | | 6/2019 | |

OTHER PUBLICATIONS

Frazier, W. "Metal Additive Manufacturing: A Review" J. Materials Engineering & Performance, vol. 23(6), pp. 1917-1928 (2014) (Year: 2014).*

Kim, H., et al. "Process-Level Modeling and Simulation for HP's Multi Jet Fusion 3D Printing Technology" IEEE Int'l Workshop on Cyber-Physical Production Sys. (2016) available from <https://ieeexplore.ieee.org/document/7483916> (Year: 2016).*

Vignat, F., et al. "Simulation based optimized beam velocity in additive manufacturing" J. Physics: Conf. series, 885, No. 012016 (2017) (Year: 2017).*

Vignat, F., et al. "Rapid Thermal Simulation of Powder Bed Additive Manufacturing" IEEE Int'l Conf. on Industrial Engineering & Engineering Management (2018) available from <https://ieeexplore.ieee.org/document/8607695> (Year: 2018).*

Anonymous and Others: "HP Multi Jet Fusion technology a disruptive 3D printing technology for a new era of manufacturing", Mar. 1, 2018 (Mar. 1, 2018), pp. 1-8.

* cited by examiner

ADAPTIVE SIMULATION IN ADDITIVE MANUFACTURING

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike some machining processes that often remove material to create the final part. In some additive manufacturing techniques, the build material may be cured or fused.

DETAILED DESCRIPTION

Figure 1:
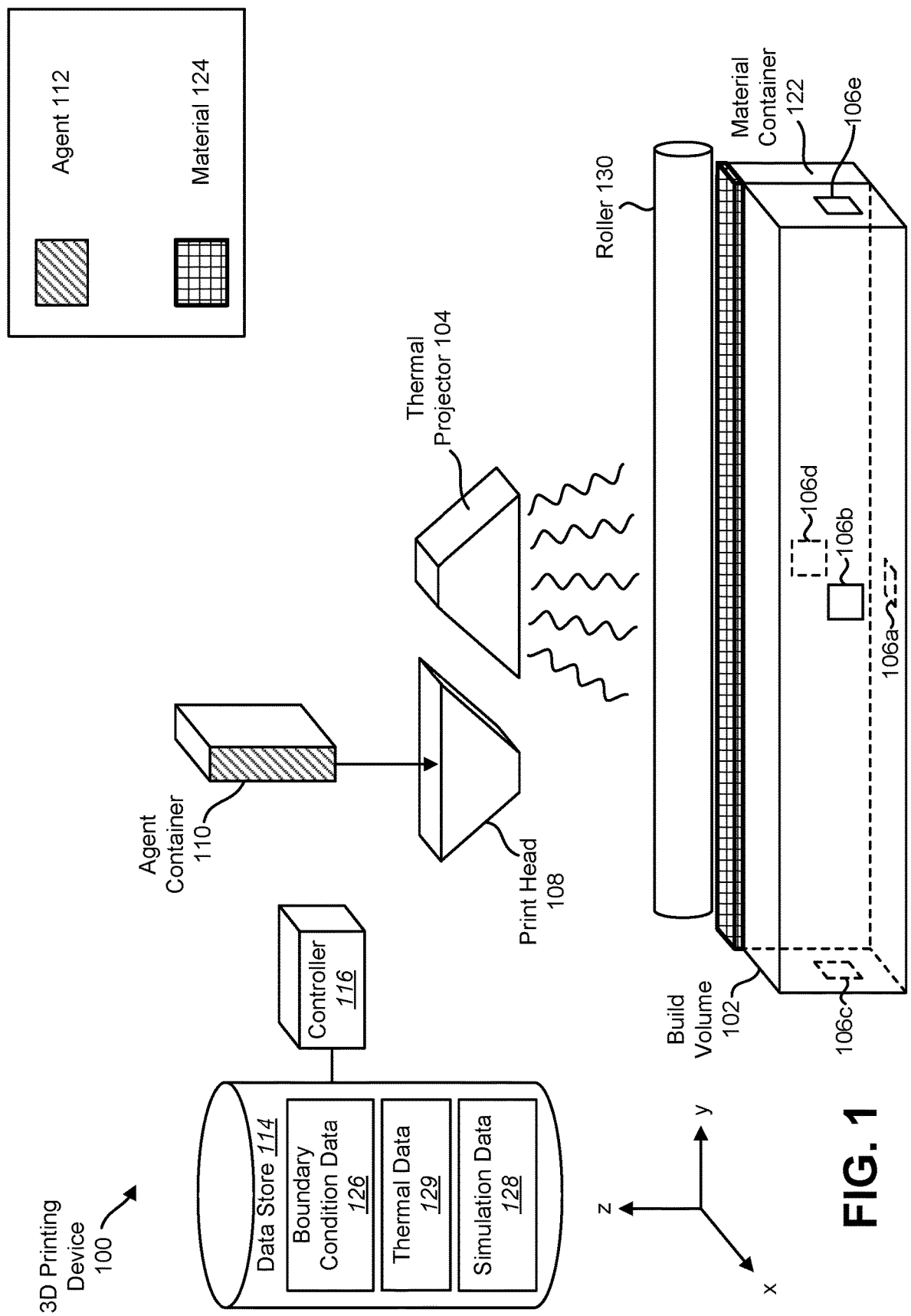
FIG. 1 is a simplified perspective view of an example of a 3D printing device that may be used in an example of adapting a simulation.

Additive manufacturing may be used to manufacture three-dimensional (3D) objects. 3D printing is an example of additive manufacturing. Some examples of 3D printing may selectively deposit agents (e.g., droplets) at a pixel level to enable control over voxel-level energy deposition. For instance, thermal energy may be projected over material in a build area, where a phase change (for example, melting and solidification) in the material may occur depending on the voxels where the agents are deposited.

A voxel is a representation of a location in a 3D space. For example, a voxel may represent a component of a 3D space. For instance, a voxel may represent a volume that is a subset of the 3D space. In some examples, voxels may be arranged on a 3D grid. For instance, a voxel may be rectangular or cubic in shape. Examples of a voxel size dimension may include 25.4 millimeters (mm)/150≈170 microns for 150 dots per inch (dpi), 490 microns for 50 dpi, 2 mm, etc. The term "voxel level" and variations thereof may refer to a resolution, scale, or density corresponding to voxel size. In some examples, the term "voxel" and variations thereof may refer to a "thermal voxel." In some examples, the size of a thermal voxel may be defined as a minimum that is thermally meaningful (e.g., greater than or equal to 42 microns or 600 dots per inch (dpi)). A set of voxels may be utilized to represent a build volume. A build volume is a volume in which an object or objects may be manufactured.

In some examples of 3D manufacturing (e.g., Multi Jet Fusion (MJF)), each voxel in the build volume may undergo a thermal procedure (approximately 15 hours of build time (e.g., time for layer-by-layer printing) and approximately 35 hours of additional cooling). The thermal procedure of voxels that include an object may affect the manufacturing quality (e.g., functional quality) of the object.

Thermal sensing may provide an amount of thermal information (e.g., a relatively small amount of spatial thermal information of the build volume and/or a relatively small amount of temporal thermal information over about 50 hours of build and cooling). For example, a thermal sensor (e.g., camera, imager, etc.) may capture about 10 seconds of a thermal voxel's 50-hour procedure when the voxel is exposed as part of a fusing layer, thereby resulting in a lack of temporal coverage. Thermal sensors at the walls and bottom of the build volume may report transient temperatures of a few selected spots, thereby resulting in a lack of spatial coverage.

Some theory-based simulation approaches (e.g., simulations based on thermodynamics laws) may provide additional spatial and temporal information for the thermal procedure (e.g., manufacturing). However, some types of simulations may not capture current (e.g., up-to-the-moment) reality and/or may not account for variation(s) in printer operation (e.g., environmental variation, printer drift, printer variation, and/or printer functioning). For example, a printer may behave differently in different environments (due to variations in humidity, for instance). Printer drifts may occur, where performance gradually changes with time, for instance. Different printers (of the same model or of different models) may behave slightly differently. Different printer functioning (e.g., settings, powder refresh rates, etc.) may cause a printer behavior change. Some types of theory-based simulations fail to capture these variations in printer operation.

A simulation of manufacturing is a procedure to model actual manufacturing. For example, simulation may be an approach to provide a prediction of manufacturing. In some examples of the techniques described herein, a data stream obtained by a thermal sensor or sensors may be utilized to correct a simulation and/or provide additional (e.g., complete) spatial and temporal coverage and reflect current (e.g., up-to-the-moment) ground truth for 3D manufacturing. For example, data from a thermal sensor or sensors may be utilized to correct a simulation of MJF manufacturing.

In some examples of the techniques described herein, data streams generated by thermal sensors corresponding to (e.g., embedded on) five barriers of a build volume (four side walls and a bottom) may be utilized. For example, these data streams may be used to adapt (e.g., continuously correct) a process simulation to ensure that the process simulation reflects current conditions (e.g., the up-to-the-moment situation).

In some examples, a stream of data from a thermal sensor at a point of a boundary may differ from thermal images over an area. For example, a thermal sensor at a point may provide comparatively reduced spatial coverage (e.g., a point or points of coverage per boundary compared to thermal image area coverage). In some examples, a thermal sensor may provide comparatively increased temporal coverage. For instance, data from a point of a boundary may be taken periodically (e.g., at approximate five second intervals) over an extended period of time, while a thermal imager may capture a relatively brief period (e.g., 10 seconds for a thermal voxel) while a layer is exposed. Utilizing thermal sensors at a point or points to improve process simulation may be accomplished by using sensing data to adapt simulation parameters in boundary conditions used by the process simulation.

Some examples of the techniques described herein may provide process simulation that accounts for up to current ground truth and can continuously learn and adapt to situational change. This may allow process simulation beyond offline prediction, which may predict a batch's yield before printing. For instance, some examples of the techniques described may beneficially allow process simulation to be utilized in operational applications due to quantitative results with improved accuracy and timeliness (e.g., up-to-the-moment results). Some examples of the techniques described herein may be implemented in a printer operating system to provide simulation results and/or printing control (e.g., printing correction).

While plastics (e.g., polymers) may be utilized as a way to illustrate some of the approaches described herein, the techniques described herein may be utilized in various examples of additive manufacturing. For instance, some examples may be utilized for plastics, polymers, semi-crystalline materials, metals, etc. Some additive manufacturing techniques may be powder-based and driven by powder fusion. Some examples of the approaches described herein may be applied to area-based powder bed fusion-based additive manufacturing, such as Stereolithography (SLA), Multi Jet Fusion (MJF), Metal Jet Fusion, Selective Laser Melting (SLM), Selective Laser Sintering (SLS), liquid resin-based printing, etc. Some examples of the approaches described herein may be applied to additive manufacturing where agents carried by droplets are utilized for voxel-level thermal modulation.

In some examples, "powder" may indicate or correspond to particles insulated with air pockets. An "object" may indicate or correspond to a location (e.g., area, space, etc.) where particles are sintered, melted, or solidified that is filled primarily with the material itself without air bubbles or with small air bubbles. For example, an object may be formed from sintered or melted powder.

Throughout the drawings, identical or similar reference numbers may designate similar, but not necessarily identical, elements. When an element is referred to without a reference number, this may refer to the element generally, without necessary limitation to any particular Figure. In some cases, multiple elements may be referred to with numbers and letters (e.g., thermal sensors 106a-e). When such an element is referred to without a letter (e.g., thermal sensor 106), this may refer to one, some, or all of the elements corresponding to that number. The figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

FIG. 1 is a simplified perspective view of an example of a 3D printing device 100 that may be used in an example of adapting a simulation. The 3D printing device 100 may include a controller 116, a data store 114, a build volume 102, a print head 108, an agent container 110, a roller 130, a material container 122, a thermal projector 104, and/or thermal sensors 106a-e. The example of a 3D printing device 100 in FIG. 1 may include additional components that are not shown, and some of the components described may be removed from the 3D printing device 100 and/or modified without departing from the scope of the 3D printing device 100 in this disclosure. The components of the 3D printing device 100 may not be drawn to scale, and thus, may have a size and/or configuration different than what is shown.

In the example of FIG. 1, the 3D printing device 100 includes an agent container 110, agent 112, a material container 122, and material 124. In other examples, the 3D printing device 100 may include more or fewer containers, agents, hoppers, and/or materials. The material container 122 is a container that stores material 124 that may be applied (e.g., spread) onto the build volume 102 by the roller 130 for 3D printing. The agent container 110 is a container that stores an agent 112. The agent 112 is a substance (e.g., liquid, powder, etc.) for 3D printing. In some examples, the agent 112 may be a fusing agent that controls intake thermal intensity. For instance, the agent 112 may be selectively applied to cause applied material 124 to change phase with heat applied from the thermal projector 104 and/or to fuse with another layer of material 124. For instance, areas of material 124 where the agent 112 has been applied may eventually solidify into the object(s) being printed. In some examples, the agent 112 may be a detailing agent. Detailing agent is a substance (e.g., liquid, powder, etc.) that controls outtake thermal intensity. For example, detailing agent may be selectively applied to detail edges of the object(s) being printed.

The build volume 102 is a volume in which additive manufacturing may be performed. In the example illustrated in FIG. 1, the build volume 102 is rectangular and is partially enclosed with five barriers: a bottom barrier, a front barrier, a back barrier, a left barrier, and a right barrier. Other shapes and/or numbers of boundaries may be implemented in other examples. For example, the build volume may be cubic, prismatic, polygonal, curved, elliptical, spherical, etc. A barrier is matter that encloses a build volume. For example, a barrier may be metal, plastic, and/or other matter that forms an edge of a build volume. A barrier may be referred to as a wall in some examples. A barrier or barriers may form a build enclosure. In some examples, the build volume 102 may be defined by the build enclosure. A boundary is an edge of a volume (e.g., build volume) or area. A barrier may correspond to a boundary or may be an example of a boundary. For example, a build volume 102 may be in the form of a rectangular block, where a top boundary is a fusing layer and the other five boundaries are barriers or walls. In some examples, each of these five boundaries may be denoted with an integer "boundary_id," where boundary_id={0, 1, 2, 3, 4}. In a simulation, each of these five boundaries may be modeled as convective boundaries.

The roller 130 is a device for applying material 124 to the build volume 102. In order to print a 3D object or objects, the roller 130 may successively apply (e.g., spread) material 124 (e.g., a powder) and the print head 108 may successively apply and/or deliver (e.g., print) agent 112. The thermal projector 104 is a device that delivers energy (e.g., thermal energy, heat, etc.) to the material 124, to agent 112, and/or in the build volume 102. For example, agent 112 may be applied on a material 124 layer where particles (of the material 124) are meant to fuse together. The areas exposed to energy (e.g., thermal energy from the thermal projector 104) and reactions between the agent 112 and the material 124 may cause the material 124 to selectively fuse together to form the object(s).

The print head 108 is a device to apply a substance or substances (e.g., agent 112 and/or). The print head 108 may be, for instance, a thermal inkjet print head, a piezoelectric print head, etc. The print head 108 may include a nozzle or nozzles (not shown) through which the agent 112 may be extruded. In some examples, the print head 108 may span a dimension of the build volume 102. Although a single print head 108 is depicted, multiple print heads 108 may be used that span a dimension of the build volume 102. Additionally, a print head or heads 108 may be positioned in a print bar or bars. The print head 108 may be attached to a carriage (not shown in FIG. 1). The carriage may move the print head 108 over the build volume 102 in a dimension or dimensions.

The material 124 is a substance (e.g., powder) for manufacturing objects. The material 124 may be moved (e.g., scooped, lifted, and/or extruded, etc.) from the material container 122, and the roller 130 may apply (e.g., spread) the material 124 into the build volume 102 (on top of a current layer, for instance). In some examples, the roller 130 may span a dimension of the build volume 102 (e.g., the same dimension as the print head 108 or a different dimension than the print head 108). Although a roller 130 is depicted, other means may be utilized to apply the material 124 to the build volume 102. In some examples, the roller 130 may be attached to a carriage (not shown in FIG. 1). The carriage may move the roller 130 over the build volume 102 in a dimension or dimensions. In some implementations, multiple material containers 122 may be utilized. For example, two material containers 122 may be implemented on opposite sides of the build volume 102, which may allow material 124 to be spread by the roller 130 in two directions.

In some examples, the thermal projector 104 may span a dimension of the build volume 102. Although one thermal projector 104 is depicted, multiple thermal projectors 104 may be used that span a dimension of the build volume 102. Additionally, a thermal projector or projectors 104 may be positioned in a print bar or bars. The thermal projector 104 may be attached to a carriage (not shown in FIG. 1). The carriage may move the thermal projector 104 over the build volume 102 in a dimension or dimensions.

In some examples, each of the print head 108, roller 130, and thermal projector 104 may be housed separately and/or may move independently. In some examples, two or more of the print head 108, roller 130, and thermal projector 104 may be housed together and/or may move together. In one example, the print head 108 and the thermal projector 104 may be housed in a print bar spanning one dimension of the build volume 102, while the roller 130 may be housed in a carriage spanning another dimension of the build volume 102. For instance, the roller 130 may apply a layer of material 124 in a pass over the build volume 102, which may be followed by a pass or passes of the print head 108 and thermal projector 104 over the build volume 102.

The controller 116 is a computing device, a semiconductor-based microprocessor, a Central Processing Unit (CPU), Graphics Processing Unit (GPU), Field-Programmable Gate Array (FPGA), an application-specific integrated circuit (ASIC), and/or other hardware device. The controller 116 may be connected to other components of the 3D printing device 100 via communication lines (not shown).

The controller 116 may control actuators (not shown) to control operations of the components of the 3D printing device 100. For example, the controller 116 may control an actuator or actuators that control movement of the print head 108 (along the x-, y-, and/or z-axes), actuator or actuators that control movement of the roller 130 (along the x-, y-, and/or z-axes), and/or actuator or actuators that control movement of the thermal projector 104 (along the x-, y-, and/or z-axes). The controller 116 may also control the actuator or actuators that control the amounts (e.g., proportions) of agent 112 to be deposited by the print head 108 from the agent container 110. In some examples, the controller 116 may control an actuator or actuators that raise and lower a base of the build volume 102 along the z-axis.

The controller 116 may communicate with a data store 114. The data store 114 may include machine-readable instructions that cause the controller 116 to control the supply of material 124, to control the supply of agent 112 to the print head 108, to control movement of the print head 108, to control movement of the roller 130, and/or to control movement of the thermal projector 104.

In some examples, the controller 116 may control the roller 130, the print head 108, and/or the thermal projector 104 to print a 3D object or objects based on a 3D model. For instance, the controller 116 may utilize a contone map or maps that are based on the 3D model to control the print head 108. A contone map is a set of data indicating a location or locations (e.g., areas) for printing a substance (e.g., agent 112). In some examples, a contone map may include or indicate machine instructions (e.g., voxel-level machine instructions) for printing a substance. For example, a fusing agent contone map may indicate coordinates and/or an amount for printing the agent 112. In some examples, a detailing agent contone map may be utilized for printing detailing agent (with or without fusing agent, for instance). In some examples, a contone map may correspond to a two-dimensional (2D) layer (e.g., 2D slice, 2D cross-section, etc.) of the 3D model. For instance, a 3D model may be processed to produce a plurality of contone maps corresponding to a plurality of layers of the 3D model. In some examples, a contone map may be expressed as a 2D grid of values, where each value may indicate whether to print an agent and/or an amount of agent at the location on the 2D grid. For instance, the location of a value in the 2D grid may correspond to a location in the build volume 102 (e.g., a location (x, y) of a particular level (z) at or above the base of the build volume 102). In some examples, a contone map may be a compressed version of the aforementioned 2D grid or array (e.g., a quadtree).

The data store 114 is a machine-readable storage medium. Machine-readable storage is any electronic, magnetic, optical, or other physical storage device that stores executable instructions and/or data. A machine-readable storage medium may be, for example, Random Access Memory (RAM), an Electrically Erasable Programmable Read-Only Memory (EEPROM), a storage drive, an optical disc, and the like. A machine-readable storage medium may be encoded with executable instructions for controlling the 3D printing device 100. A computer-readable medium is an example of a machine-readable storage medium that is readable by a processor or computer.

A thermal sensor 106 is a device that senses or captures thermal data. Examples of thermal sensors may include thermal sensitive resistors (thermistors), resistance temperature detectors, silicon bandgap temperature sensors, diodes, and/or transistors, etc. A thermal sensor may be integrated into, mounted in, and/or otherwise included in a machine (e.g., printer). For example, a thermal sensor may correspond to, may be attached to, and/or may be included in a barrier of a build volume. In the example of FIG. 1, the 3D printing device 100 includes five thermal sensors 106*a-e*. A first thermal sensor 106*a* corresponds to a bottom barrier of the build volume 102, a second thermal sensor 106*b* corresponds to a front barrier of the build volume 102, a third thermal sensor 106*c* corresponds to a left barrier of the build volume 102, a fourth thermal sensor 106*d* corresponds to a back barrier of the build volume 102, and a fifth thermal sensor 106*e* corresponds to a right barrier of the build volume 102. The thermal sensors 106a-e may each provide measurements (e.g., thermal data, temperatures) for a corresponding barrier. In some examples, the thermal sensors 106a-e may provide measurements during manufacturing (e.g., printing). For example, the thermal sensors 106 may provide measurements online and/or in real-time.

While the example of FIG. 1 illustrates five thermal sensors 106, other numbers of sensors may be utilized. For example, one, two, three, four, five, or more thermal sensors may be utilized. In some examples, multiple thermal sensors may be utilized per barrier. For instance, each barrier may have two corresponding thermal sensors.

In some examples, each thermal sensor 106 may correspond to a point of a barrier. For instance, a thermal sensor 106 may provide measurements for one location of a barrier. A thermal sensor that corresponds to a point of a barrier may be referred to as a point thermal sensor. In some examples, a thermal sensor (and/or measurements from a thermal sensor) may correspond to a voxel (e.g., a single voxel, coordinate location) of the build volume. For instance, a point thermal sensor on a barrier (e.g., wall) of the build volume may be utilized to report measurements (e.g., thermal data, temperatures) at times (e.g., periodically).

In some examples, the controller 116 may receive measurements from the thermal sensors 106a-e. For example, the controller 116 may command the thermal sensors 106a-e to take measurements and/or may receive measurements from the thermal sensors 106a-e. In some examples, the thermal sensors 106a-e may provide measurements for each barrier of the build volume 102. The measurements may be stored as thermal data 129 in the data store 114. In some examples, the controller 116 may interpolate measurements (e.g., sensed temperatures) in a time range to produce a measurement (e.g., interpolated sensed temperature). For example, interpolation may be performed in order to synchronize measurement time with simulation time. In some examples, the controller 116 may average measurements (e.g., sensed temperatures) from multiple thermal sensors to produce a measurement (e.g., averaged sensed temperature). For example, the controller 116 may average measurements from multiple thermal sensors that correspond to the same barrier or wall.

In some examples, the data store 114 may store boundary condition data 126, thermal data 129, and/or simulation data 128. The boundary condition data 126 includes data indicating a boundary condition or boundary conditions for a barrier or barriers of the build volume 102. A boundary condition is a condition to be satisfied at a boundary of a region. For instance, a boundary condition may dictate the temperature(s) to be satisfied by a simulation at a boundary of a region when simulating the thermal behavior of the region (e.g., area or volume). In some examples, boundary conditions may correspond to barriers of the build volume. For example, a measurement from a barrier may be utilized to adapt a boundary condition of a simulation.

The simulation data 128 may include simulation instructions for simulating three-dimensional (3D) manufacturing. For example, the controller 116 may execute the simulation instructions to simulate the thermal behavior (e.g., transient temperature) of material 124 in the build volume 102 (e.g., a layer or layers of the material 124). In some examples, the controller 116 may simulate the 3D manufacturing based on a digital model (of an object or object(s) to be printed), a slice or slices, and/or a contone map or maps. In some examples, the controller 116 may simulate thermal behavior of a layer or layers that have not yet been applied. In some examples, the controller 116 may simulate 3D manufacturing for a time range to produce a simulated temperature or temperatures. For instance, the simulation may produce temperatures for all or a portion of the build volume 102. Some simulated temperatures may correspond to the locations (e.g., point(s), voxel(s)) of the thermal sensors 106.

In some examples, the controller 116 may simulate 3D manufacturing (e.g., layer(s)) using a boundary condition that is based on the measurement(s) from the thermal sensors 106a-e. For example, the controller 116 may adapt a boundary condition of the simulation of the 3D manufacturing based on a measurement from a thermal sensor 106 at a point of a build enclosure (e.g., barrier). In some examples, the controller 116 may execute the simulation instructions to determine a temperature difference (e.g., normalized temperature difference) between a simulated temperature and a measurement (e.g., a sensed temperature) from a thermal sensor 106. The controller 116 may adjust, based on the temperature difference, a boundary condition to simulate 3D manufacturing (e.g., for a time range, subsequent time range, subsequent layers, etc.).

In some examples, the controller 116 may print a layer or layers based on the simulation. For instance, the controller 116 may control the amount and/or location of agent 112 for a layer based on the simulation of the layer(s). In some examples, the controller 116 may drive model setting (e.g., the size of the stride) based on the simulated layer(s). In some examples, the controller 116 may perform offline print mode tuning based on the simulated layer(s). For example, if the simulation indicates systematic bias (e.g., a particular portion of the build volume 102 is consistently colder or warmer than baseline), the data pipeline may be altered such that the contone map(s) are modified to compensate for such systematic bias. For instance, if the simulation indicates a systematic bias, the controller 116 may adjust contone map generation (for a layer or layers, for example) to compensate for the bias. Accordingly, the location and/or amount of agent(s) deposited may be adjusted based on the contone map(s) to improve print accuracy and/or performance.

Figure 2:
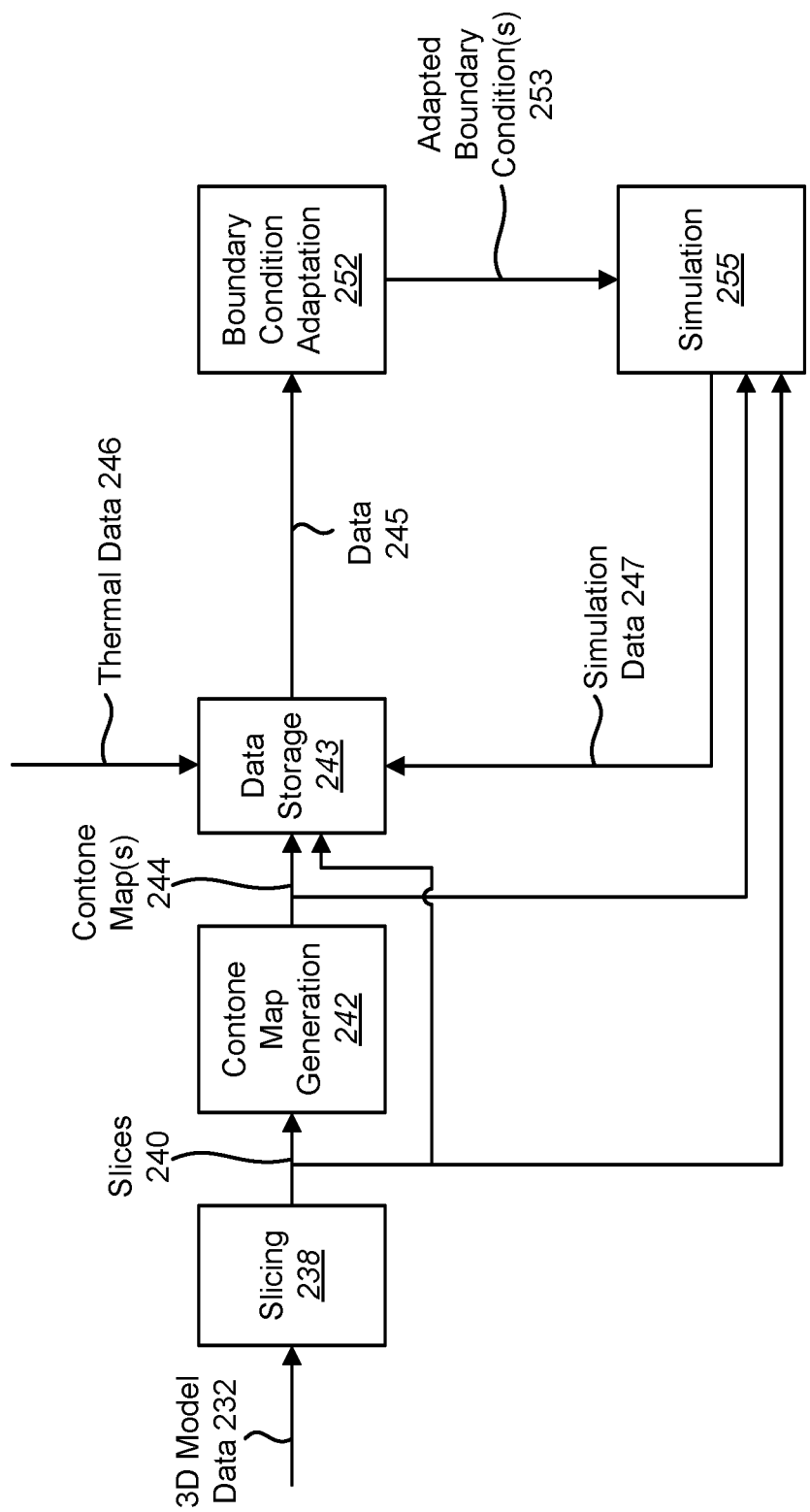
FIG. 2 is a block diagram illustrating examples of functions that may be implemented for adapting simulations.

FIG. 2 is a block diagram illustrating examples of functions that may be implemented for adapting simulations. In some examples, one, some, or all of the functions described in connection with FIG. 2 may be performed by the controller 116 described in connection with FIG. 1. For instance, instructions for slicing 238, contone map generation 242, data storage 243, boundary condition adaptation 252, and/or simulation 255 may be stored in the data store 114 and executed by the controller 116 in some examples. In other examples, a function or functions (e.g., slicing 238, contone map generation 242, data storage 243, boundary condition adaptation 252, and/or simulation 255) may be performed by another apparatus. For instance, slicing 238 may be carried out on a separate apparatus and sent to the 3D printing device 100.

3D model data 232 may be obtained. For example, the 3D model data 232 may be received from another device and/or generated. The 3D model data 232 may specify shape and/or size of a 3D model for printing a 3D object or objects. 3D model data 232 can define both the internal and the external portion of the 3D object. The 3D model data 232 can be defined, for example, using polygon meshes. For example, the 3D model data 232 can be defined using a number of formats such as a 3D manufacturing format (3MF) file format, an object (OBJ) file format, and/or a stereolithography (STL) file format, among other type of file formats. In some examples, the 3D model data may be referred to as a "batch." In some examples, the 3D model data 232 may be provided to data storage 243 and/or to simulation 255.

Slicing 238 may be performed based on the 3D model data 232. For example, slicing 238 may include generating a set of 2D slices 240 corresponding to the 3D model data 232. In some approaches, the 3D model indicated by the 3D model data 232 may be traversed along an axis (e.g., a vertical axis, z-axis, or other axis), where each slice 240 represents a 2D cross section of the 3D model. For example, slicing 238 the 3D model can include identifying a z-coordinate of a slice plane. The z-coordinate of the slice plane can be used to traverse the 3D model to identify a portion or portions of the 3D model intercepted by the slice plane.

A 3D model and/or stack of 2D slices (e.g., vector slices) may be utilized to generate per-layer machine instructions (e.g., voxel-level agent distribution) by accounting for process physics. Contone maps may be examples of per-layer machine instructions. In some examples, contone map generation 242 may be performed based on the slices 240. For example, a contone map or contone maps 244 may be generated for each slice 240. For instance, contone map generation 242 may include generating a fusing contone map and a detailing contone map, where the fusing contone map indicates an area or areas and density distribution for printing fusing agent for a layer. The detailing contone map indicates an area or areas and density distribution for printing detailing agent for the layer. The contone map or maps 244 may be represented in a variety of file formats in some examples. For instance, a contone map 244 may be formatted as an image file and/or another kind of contone file. In some examples, a function or functions described in connection with FIG. 2 may be performed by a printer. For example, 3D model data 232 may be loaded onto a printer, which may perform a function or functions described in connection with FIG. 2. In some examples, slicing 238 and/or contone map generation 242 may include using instructions to voxelize and/or rasterize the 3D model data 232 (e.g., geometry) and generating agent dispensing maps (e.g., fusing agent and/or detailing agent contone map(s) 244) for a build.

The contone map(s) 244, slices 240, and/or thermal data 246 (e.g., captured measurement(s) and/or sensed temperature(s)) may be stored using a data storage 243 function. For example, the contone map(s) 244, slices 240, and/or thermal data 246 may be stored (in a database, for instance) in a storage device.

In some examples, the thermal data 246 may include a measurement or measurements (e.g., "sensed_temperature") from a thermal sensor or sensors. In some examples, the thermal data 246 may include a timestamp or timestamps corresponding to the measurement(s). In some examples, the thermal data 246 may include a boundary identifier or identifiers (e.g., "boundary_id") corresponding to the measurement(s). In some examples, the thermal data 246 may include a sensor identifier or identifiers (e.g., "sensor_id") corresponding to the measurement(s). For example, the thermal data 246 may include (timestamp, sensed_temperature, boundary_id, sensor_id). In an example with five boundaries and two thermal sensors per boundary, boundary_id={0, 1, 2, 3, 4} and sensor_id={0, 1}. In some examples, a printer may write thermal data 246 into a database. In an example, the thermal data 246 includes measurements from 10 point thermal sensors (i.e., two point thermal sensors per barrier or boundary). Each thermal sensor may report a timestamp and temperature periodically (e.g., at a time interval of a few seconds, such as approximately five seconds).

In some examples, simulation data 247 may be stored using a data storage 243 function. In some examples, the simulation data 247 may include simulated temperatures and/or boundary conditions (e.g., boundary conditions used for simulation). For example, the simulation data 247 may include simulated temperatures (e.g., "sim_temperature," transient temperature history) for a voxel or voxels (e.g., every voxel) in the build volume with timestamp(s) and/or voxel identifier(s) (e.g., "voxel_id"): (timestamp, sim_temperature, voxel_id). For example, the simulation 255 may provide (e.g., store) transient simulation results to a database.

Each thermal sensor (e.g., (boundary_id, sensor_id)) may have a corresponding unique voxel identifier. Accordingly, the voxel identifier(s) may be used to determine a simulated temperature corresponding to a measurement from a thermal sensor. In some examples, the simulation data 247 may include boundary conditions (e.g., "boundary_conditions") with timestamp(s) and/or boundary identifier(s): (timestamp, boundary_id, boundary_conditions).

In some examples, printing and simulation may execute independently. In some approaches, where simulation is utilized by the printer to guide printer operations, the simulation may simulate a layer or layers ahead of actual production to provide just-in-time prediction.

Data 245 may be provided to a boundary condition adaptation 252 function. For example, the boundary condition adaptation 252 may retrieve the data 245 from a database on demand. The data 245 may include simulated temperatures, measurements (e.g., sensed temperatures), and/or boundary conditions with corresponding time stamps. The data 245 may include information from a time range. For example, for each (boundary_id, sensor_id), two time series may be extracted: (timestamp, sim_temperature) and (timestamp, sensed_temperature), for all timestamps in a range (T-DT, T). In the range, T is a recent or current simulation time, and DT is a time interval representing for prior history. In some examples, T is a minimum (e.g., oldest) time between a current simulation time (e.g., "current_sim_time") and a current printing time (e.g., "current_print_time"), which may be expressed as min(current_sim_time, current_print_time). Some examples of DT may include 2 minutes, 5 minutes, 10 minutes, etc. For instance, the range (T-DT, T) may provide a most recent time series for both simulated and sensed data. In some examples, (timestamp, boundary_id, boundary_conditions) may be extracted. In some examples, the two time series may be extracted for each thermal sensor. For instance, for each of 10 sensors (and each corresponding voxel identifier), two time series may be retrieved: (timestamp, sim_temperature), (timestamp, sensed_temperature).

Boundary condition adaptation 252 may produce adapted boundary conditions 253. For example, the boundary condition adaptation 252 function may generate adapted (e.g., corrected) boundary conditions 253 (e.g., updated heat transfer coefficients) for each boundary (e.g., boundary_id). For example, for each boundary_id, the boundary condition adaptation 252 function may provide (boundary_id, boundary_conditions). The adapted boundary condition(s) 253 may reduce (e.g., minimize) differences between the simulated time series and the sensed time series for a thermal sensor or sensors belonging to a boundary (e.g., boundary_id). The adapted boundary conditions 253 may be provided to the simulation 255 function to modify subsequent simulation (e.g., simulation for a next time period or range).

In some approaches, thermal behavior for a build volume at a barrier or boundary may be modeled in accordance with Equation (1). Equation (1) may express how heat flux conducted out of the build volume through a boundary is balanced out by the heat flux taken away by air flow surrounding the boundary.

$$-kn*\nabla T(x,t)=h*(T_\infty - T(x,t)) \quad (1)$$

In Equation (1), k is material thermal conductivity (considering sizable powder placed around the barriers, both close to the four side barriers and powder layers over the bottom barrier, for example). In some cases, powder thermal conductivity may be less likely to be a source of temperature deviation from simulation temperature to sensing temperature. In Equation (1), T(x,t) denotes a temperature T for a point x on a boundary at time t, h is a boundary condition (e.g., boundary condition coefficient or heat transfer coefficient), T∞ is an ambient temperature (e.g., a temperature that surrounds the build volume), n is a vector of unit length perpendicular to the boundary surface that points outwards, ∇ is a gradient operator, and kn*∇T is the heat flux transmitted out of a voxel through the boundary. T(x,t) may be computed by solving Equation (1). Estimating h may be difficult, where h is associated with the ability of air flow surrounding the build volume to remove heat. While other boundary condition parameters may be used to adjust or tune a boundary condition, h is described as an example. For example, h may refer to a boundary condition (e.g., current h) used for simulation. In some examples, dh denotes an estimated adjustment. For instance, h+dh may be provided to a simulation to adapt the boundary condition for subsequent simulation (e.g., a next time range or time period).

Equation (2) may be derived based on Equation (1) as follows.

$$\frac{dh}{h} = \frac{d\left(\frac{T}{T_\infty}\right)}{1-\left(\frac{T}{T_\infty}\right)} \quad (2)$$

In Equation (2), $$d\left(\frac{T}{T_\infty}\right)$$

denotes a differential of temperatures normalized by ambient temperature.

A generalization of Equation (2) is given in Equation (3) as follows.

$$\frac{d\left(\frac{T}{T_\infty}\right)}{1-\left(\frac{T}{T_\infty}\right)} = f\left(\frac{dh}{h}\right) \quad (3)$$

In Equation (3), f denotes a function and $$\frac{d\left(\frac{T}{T_\infty}\right)}{1-\left(\frac{T}{T_\infty}\right)}$$

is an example of normalized temperature difference. The normalized temperature difference may be controlled by adjusting h. In some approaches, h is an example of a boundary condition that is tunable in accordance with some examples of the techniques described herein. Other examples of boundary conditions that may be utilized in accordance with the techniques described herein may include additional or other terms and/or different forms of boundary conditions.

In some examples, the boundary condition adaptation 252 function may condition the data 245. For instance, measurements (e.g., sensed temperatures) may be taken at different times (with differing timestamps) than simulated temperatures. In some examples, the boundary conditional adaptation 252 may interpolate measurements (e.g., sensed temperatures) in a time range in order to produce a measurement at a time that is aligned with or synchronized with a simulation time of a simulated temperature. For example, for each (boundary_id, sensor_id), interpolation may be applied to synchronize the timestamps.

For each boundary or barrier, the boundary condition adaptation 252 may obtain a sequence of (t, Ts, dT, h), where t is a timestamp (e.g., synchronized timestamp) with t=t0, t1, t2, . . . , tn, Ts is sensed temperature, dT is a temperature difference (e.g., normalized temperature difference) between simulated temperature and sensed temperature, and h is the boundary condition (e.g., heat transfer coefficient) applied at tin the simulation 255. The h value may change when the simulation 255 receives an adapted boundary condition 253 to update the h value to h+dh. In some examples, the boundary condition adaptation 252 function may average sensed temperatures from thermal sensors to produce a sensed temperature (e.g. Ts). In some examples, Ts and/or dT may be synthesized measurements from multiple thermal sensors for a boundary_id. For example, the measurements from different sensors that correspond to the same barrier or boundary may be synthesized as an average or weighted average.

In some examples, the boundary condition adaptation 252 function may generate an adapted boundary condition 253 (e.g., an adapted h or corrected h). In some examples, adapting the boundary condition may be performed in response to determining that a difference between a measurement and a simulated temperature is greater than a threshold. For instance, the simulation 255 may be initialized based on theoretical values (e.g., initialized with h(boundary_id)). If a most recent measurement satisfies a threshold (e.g., if dT exceeds a threshold or if a simulated temperature at the thermal sensor voxel_id differs from a thermal sensor measurement significantly), the boundary condition adaptation 252 function may be triggered to adapt a boundary condition (e.g., determine a new h). Some examples of thresholds may include 1 degree Celsius (C), 2 C, 3 C, etc.

In some examples, adapting the boundary condition may include determining a temperature difference (e.g., normalized temperature difference) between the measurement and a simulated temperature. The temperature difference may be a normalized temperature difference as described in connection with Equation (2) or may be a difference (e.g., subtraction) between the measurement and the simulated temperature. For instance, after some initial simulation and measurement (e.g., when a few records of (t, Ts, dT, h) have been obtained, such as a number of records in a 5-minute duration), the boundary condition adaptation 252 function may apply Equation (2) or a variation to determine the temperature difference (e.g., normalized temperature difference) to determine an estimated adjustment (dh), which may be utilized to determine an adapted boundary condition 253 (e.g., an updated h value).

In some examples, measurements (e.g., sensed temperatures) may be utilized to determine temperature differences (e.g., dT) to improve the estimated adjustment (dh) with a data-driven approach. For example, the boundary condition adaptation 252 function may determine a fitted function based on a set of sensed temperatures and a set of simulated temperatures. For instance, (t, Ts, dT, h), where t=t0, t1, t2, . . . , tn, may provide n sample points of (dT, dh/h). Based on the n sample points, the boundary condition adaptation 252 function may fit a function for dT=f(dh/h). Determining the fitted functions may be based on a regression (e.g., linear regression), kernel-based fitting (e.g., support vector regression (SVR)) and/or machine learning (e.g., neural network). In some examples, determining the fitted function may include weighting the set of sensed temperatures based on age. For instance, the n sample points of (dT, dh/h) may be treated differently accounting for age, where more recent sample points may be weighted more than older sample points. The differently weighted samples may be applied in determining the fitted function.

In some examples, a function may be fitted for dt=f(dh/h) by utilizing a neural network to model the mapping from f(dh/h) to dT. For example, the neural network may include one or two fully connected layers, where each layer has several nodes. A stochastic gradient decent (SGD) procedure may be followed, where each (dT, dh/h) in the time series may be treated as a stochastic training sample to tune the parameters online by SGD. A learning rate (e.g., a small learning rate) may be set to avoid large oscillations of the parameters. In some approaches, online tuning may be performed instead of fitting the parameters in a neural network offline with a large set of training data. Offline tuning may be performed in other approaches.

In some examples, the boundary condition adaptation 252 function may determine an estimated adjustment (dh) based on the fitted function (and a temperature difference, for instance). For example, dh may be determined based on the fitted function f, given dT. Adapting the boundary condition may include applying the estimated adjustment to the boundary condition (e.g., h=h+dh). The adapted boundary condition 253 (e.g., h=h+dh) may be applied to the simulation 255. For example, the boundary condition of the simulation 255 may be updated to drive reduction of the temperature difference between the simulated temperature and the sensed temperature.

In some examples, adapting the boundary condition may include applying a damping parameter to the estimated adjustment. A damping parameter is a value to scale the estimated adjustment. For example, a damping parameter a (where a is between 0 and 1) may be used such that h=h+a*dh, to apply the estimated adjustment gradually.

The simulation 255 produces simulation data 247, which may be provided to data storage 243. For example, upon completing the simulation 255 of a layer, the thermal behavior (e.g., temperature) for each thermal voxel may be recorded into a database. For instance, a simulated layer that is based on a simulation 255 with an adapted boundary condition may be stored in memory. In some examples, the function(s) (e.g., boundary condition adaptation 252 and/or simulation 255) may be repeated.

In some examples, an operation or operations may be performed based on the simulation data 247. For example, control information may be determined based on the simulation data 247. The control information may be utilized to print a layer or layers based on the simulation data 247. For instance, the control information may indicate controlling the amount and/or location of fusing agent and/or detailing agent for a layer based on the simulation data 247. In some examples, the control information may drive model setting (e.g., the size of the stride) based on the simulation data 247. In some examples, the control information may indicate offline print mode tuning based on the simulation data 247. For example, if the simulation data 247 indicates systematic bias (e.g., a particular portion of the build area is consistently colder or warmer than baseline), the data pipeline may be altered such that the contone maps are modified to compensate for such systematic bias. For instance, if the simulation data 247 indicates a systematic bias, the control information may indicate an adjustment to contone map generation (for a layer or layers, for example) to compensate for the bias. Accordingly, the location and/or amount of agent(s) deposited may be adjusted based on the contone map(s) to improve print accuracy and/or performance. In some examples, performing an operation may include presenting the simulation data 247 on a display and/or sending the simulation data 247 to another device.

Figure 3:
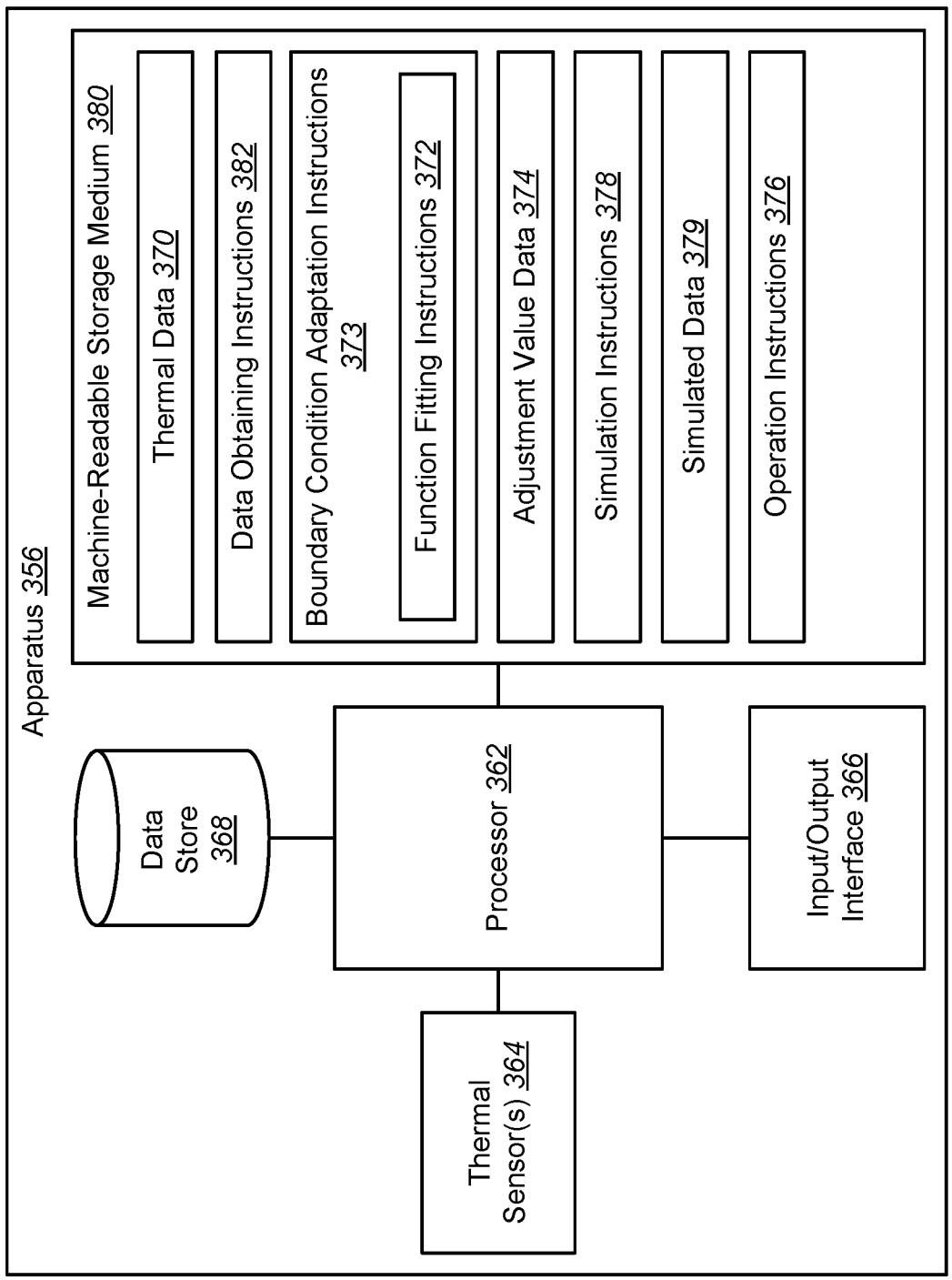
FIG. 3 is a block diagram of an example of an apparatus that may be used in adapting simulation.

FIG. 3 is a block diagram of an example of an apparatus 356 that may be used in adapting simulation. The apparatus 356 may be a computing device, such as a personal computer, a server computer, a printer, a 3D printer, a smartphone, a tablet computer, etc. The apparatus 356 may include and/or may be coupled to a processor 362, a data store 368, an input/output interface 366, a machine-readable storage medium 380, and/or a thermal sensor or sensors 364. In some examples, the apparatus 356 may be in communication with (e.g., coupled to, have a communication link with) an additive manufacturing device (e.g., the 3D printing device 100 described in connection with FIG. 1). In some examples, the apparatus 356 may be an example of the 3D printing device 100 described in connection with FIG. 1. For instance, the processor 362 may be an example of the controller 116 described in connection with FIG. 1, the data store 368 may be an example of the data store 114 described in connection with FIG. 1, and the thermal sensor or sensors 364 may be an example of the thermal sensors 106 described in connection with FIG. 1. The apparatus 356 may include additional components (not shown) and/or some of the components described herein may be removed and/or modified without departing from the scope of this disclosure.

The processor 362 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 380. The processor 362 may fetch, decode, and/or execute instructions (e.g., operation instructions 376) stored on the machine-readable storage medium 380. In some examples, the processor 362 may include an electronic circuit or circuits that include electronic components for performing a functionality or functionalities of the instructions (e.g., operation instructions 376). In some examples, the processor 362 may be implemented to perform one, some, or all of the functions, operations, aspects, methods, etc., described in connection with one, some, or all of FIGS. 1-6.

The machine-readable storage medium 380 may be any electronic, magnetic, optical, or other physical storage device that contains or stores electronic information (e.g., instructions and/or data). Thus, the machine-readable storage medium 380 may be, for example, Random Access Memory (RAM), Electrically Erasable Programmable Read-Only Memory (EEPROM), a storage device, an optical disc, and the like. In some implementations, the machine-readable storage medium 380 may be a non-transitory tangible machine-readable storage medium, where the term "non-transitory" does not encompass transitory propagating signals. While that machine-readable storage medium 380 is shown as being included in the apparatus 356, a machine-readable storage medium 380 may be implemented independently (e.g., separate from an apparatus 356).

The apparatus 356 may also include a data store 368 on which the processor 362 may store information. The data store 368 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the machine-readable storage medium 380 may be included in the data store 368. In some examples, the machine-readable storage medium 380 may be separate from the data store 368. In some approaches, the data store 368 may store similar instructions and/or data as that stored by the machine-readable storage medium 380. For example, the data store 368 may be non-volatile memory and the machine-readable storage medium 380 may be volatile memory.

The apparatus 356 may further include an input/output interface 366 through which the processor 362 may communicate with an external device or devices (not shown), for instance, to receive and store the information pertaining to the object or objects to be manufactured (e.g., printed). The input/output interface 366 may include hardware and/or machine-readable instructions to enable the processor 362 to communicate with the external device or devices. The input/output interface 366 may enable a wired or wireless connection to the external device or devices. The input/output interface 366 may further include a network interface card and/or may also include hardware and/or machine-readable instructions to enable the processor 362 to communicate with various input and/or output devices, such as a keyboard, a mouse, a display, another apparatus, electronic device, computing device, etc., through which a user may input instructions into the apparatus 356.

In some examples, the machine-readable storage medium 380 may store thermal data 370. The thermal data 370 may be obtained (e.g., received) from a thermal sensor or sensors 364. For example, the processor 362 may execute data obtaining instructions 382 to obtain a set of sensed temperatures from a boundary of a build volume. The set of sensed temperatures may include measurements or sensed temperatures from a boundary or boundaries (e.g., barrier(s)) of a build volume. In some examples, the apparatus 356 may include a thermal sensor or sensors 364, may be coupled to a remote thermal sensor or sensors, and/or may receive thermal data 370 (e.g., measurement(s), sensed temperature (s)) from a (integrated and/or remote) thermal sensor. Some examples of thermal sensors 364 include thermal sensitive resistors (thermistors), resistance temperature detectors, silicon bandgap temperature sensors, diodes, and/or transistors, etc. Other kinds of thermal sensors may be utilized.

The thermal data 370 may include measurements and/or sensed temperatures. As described above, the measurements and/or sensed temperatures may correspond to a point or points of an enclosure. For example, a measurement or sensed temperature may correspond to a point of a barrier or boundary (e.g., voxel). Different types of thermal sensing devices may be used in different examples.

In some examples, the machine-readable storage medium 380 may include simulation instructions 378. The simulation instructions 378 are code to cause the processor 362 to simulate 3D manufacturing to produce simulated data 379. The simulated data 379 may include a set of simulated temperatures. Simulating the 3D manufacturing may be based on a set of boundary conditions. In some examples, an initial set of boundary conditions may be predetermined.

In some examples, the machine-readable storage medium 380 may include boundary condition adaptation instructions 373. The boundary condition adaptation instructions 373 are code to cause the processor 362 to adapt a boundary condition based on the thermal data 370. In some examples, the boundary condition adaptation instructions 373 may include function fitting instructions 372. The function fitting instructions 372 may be code to cause the processor 362 to fit a function based on the set of sensed temperatures, the set of simulated temperatures, and the set of boundary conditions. In some examples, the processor 362 may fit the function as described in connection with FIG. 2. For example, fitting a function may be based on a regression (e.g., linear regression), kernel-based fitting (e.g., support vector regression (SVR)) and/or machine learning (e.g., neural network). For instance, the processor 362 may fit the function based on the set of sensed temperatures, the set of simulated temperatures, and the set of boundary conditions (e.g., the processor 362 may use (t, Ts, dT, h), where t=t0, t1, t2, . . . , tn, to fit a function for dT=f(dh/h)).

In some examples, the boundary condition adaptation instructions 373 may include code to cause the processor 362 to calculate an adjustment value (e.g., dh) based on the function (e.g., the fitted function). For example, the processor 362 may determine an adjustment value that is mapped to a temperature difference (e.g., dT) by the function. For instance, a temperature difference (e.g., normalized temperature difference) may be applied to the function, which may provide the adjustment value. In some examples, the boundary condition adaptation instructions 373 may include code to cause the processor 362 to determine a normalized temperature difference based on the set of sensed temperatures and the set of simulated temperatures. For instance, the processor 362 may determine the normalized temperature difference in accordance with Equation (2). The normalized temperature difference may be utilized to calculate the adjustment value in some approaches. The adjustment value may be stored as adjustment value data 374 in some examples.

In some examples, the boundary condition adaptation instructions 373 may include code to cause the processor 362 to determine an adapted boundary condition based on the adjustment value. For example, the processor 362 may add the adjustment value (e.g., dh) to a boundary condition (e.g., h) to determine the adapted boundary condition (e.g., h=h+dh).

In some examples, the boundary condition adaptation instructions 373 may include code to cause the processor 362 to apply a damping parameter to the adjustment value to determine the adapted boundary condition. For example, a damping parameter a (where a is between 0 and 1) may be applied such that $h=h+\alpha*dh$.

In some examples, the simulation instructions 378 may include code to cause the processor 362 to simulate 3D manufacturing based on the adapted boundary condition. For example, the simulation instructions 378 may include code to simulate a layer or layers of a manufacturing procedure based on the adapted boundary condition. In some examples, simulation may be carried out as described in connection with FIG. 1 and/or FIG. 2. Performing the simulation may produce simulated data 379, which may be stored in the machine-readable storage medium 380. The simulated data 379 may include information indicating transient thermal behavior of a voxel or voxels based on the adapted simulation.

In some examples, the processor 362 may execute operation instructions 376 to perform an operation based on the simulated data 379. For example, the processor 362 may print (e.g., control amount and/or location of agent(s) for) a layer or layers based on the simulated data 379. In some examples, the processor 362 may drive model setting (e.g., the size of the stride) based on the simulated data 379. In some examples, the processor 362 may perform offline print mode tuning based on the simulated data 379. In some examples, the processor 362 may send a message (e.g., alert, alarm, progress report, quality rating, etc.) based on the simulated data 379. In some examples, the processor 362 may halt printing in a case that the simulated data 379 indicates an issue (e.g., more than a threshold difference between a simulated layer or layers of printing and the 3D model and/or slices). In some examples, the processor 362 may feed the simulated data 379 for a subsequent layer or layers to a thermal feedback control system to online compensate the contone maps for the upcoming layer(s). In some examples, the operation instructions 376 may include instructions to present the simulated data 379. For example, the instructions may cause the processor 362 to render and/or present the simulated data 379 on a display. For example, the simulated data 379 may be presented as a 3D graph that indicates temperature spatially over a build volume and/or that indicates temperature at a time or times.

In some examples, the machine-readable storage medium 380 may store 3D model data (not shown in FIG. 3). The 3D model data may be generated by the apparatus 356 and/or received from another device. In some examples, the machine-readable storage medium 380 may include slicing instructions (not shown in FIG. 3). For example, the processor 362 may execute the slicing instructions to perform slicing on the 3D model data to produce a stack of 2D vector slices.

In some examples, the operation instructions 376 may include 3D printing instructions. For instance, the processor 362 may execute the 3D printing instructions to print a 3D object or objects. In some implementations, the 3D printing instructions may include instructions for controlling a device or devices (e.g., rollers, print heads, and/or thermal projectors, etc.). For example, the 3D printing instructions may use a contone map or contone maps (stored as contone map data, for instance) to control a print head or heads to print an agent or agents in a location or locations specified by the contone map or maps. In some examples, the processor 362 may execute the 3D printing instructions to print a layer or layers. The printing (e.g., thermal projector control) may be based on measurements, sensed temperatures, and/or simulated layer(s). In some examples, a function or functions described in connection with FIG. 3 may be omitted and/or not performed.

Figure 4:
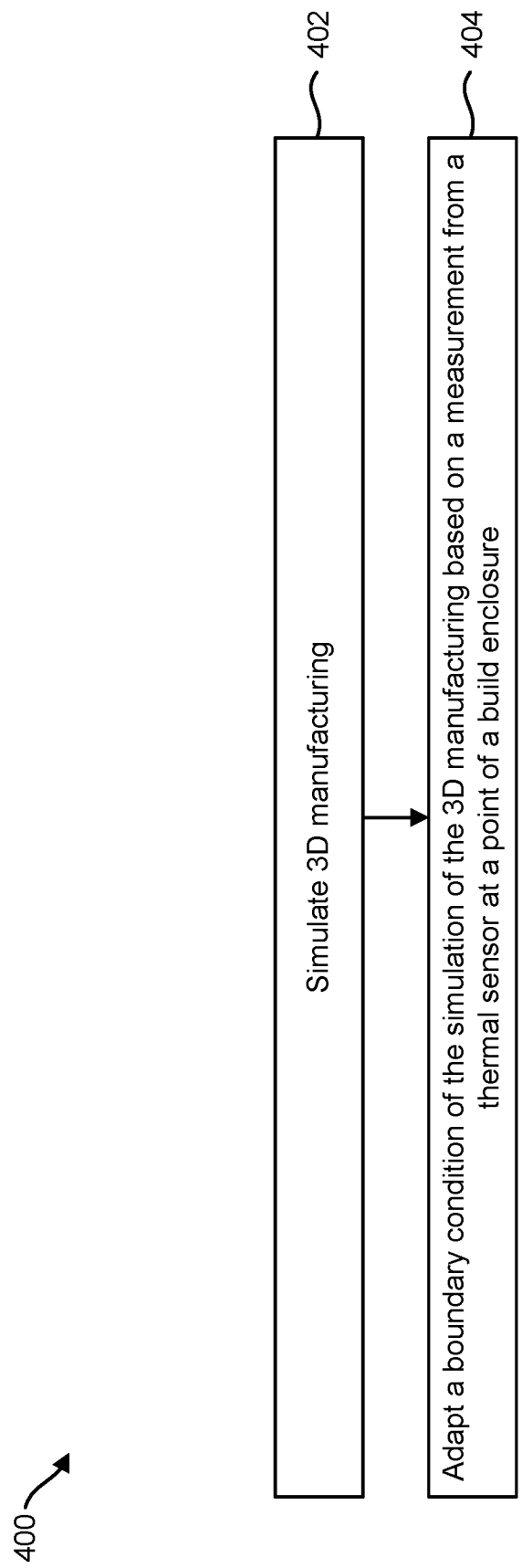
FIG. 4 is a flow diagram illustrating an example of a method for adapting simulation.

FIG. 4 is a flow diagram illustrating an example of a method 400 for adapting simulation. The method 400 and/or a method 400 procedure(s) and/or function(s) may be performed by an electronic device. For example, the method 400 may be performed by the apparatus 356 described in connection with FIG. 3 (and/or by the 3D printing device 100 described in connection with FIG. 1).

The apparatus 356 may simulate 402 3D manufacturing. This may be accomplished as described in connection with FIGS. 1, 2, and/or 3. For example, boundaries and/or barriers of a build volume may be modeled as convective boundaries to simulate the thermal behavior of material in a build volume.

The apparatus 356 may adapt 404 a boundary condition of the simulation of the 3D manufacturing based on a measurement from a thermal sensor at a point of a build enclosure. This may be accomplished as described in connection with FIGS. 1, 2, and/or 3. For example, adapting the boundary condition may include determining a temperature difference of simulated temperatures and sensed temperatures, and applying the temperature difference to a fitted function to determine an adjustment value. The adjustment value may be applied to a boundary condition (e.g., previous boundary condition) to produce an adapted boundary condition. The adapted boundary condition may be utilized to perform further simulation. In some examples, the method 400 may include a function or functions described in connection with FIGS. 1, 2, and/or 3.

Figure 5:
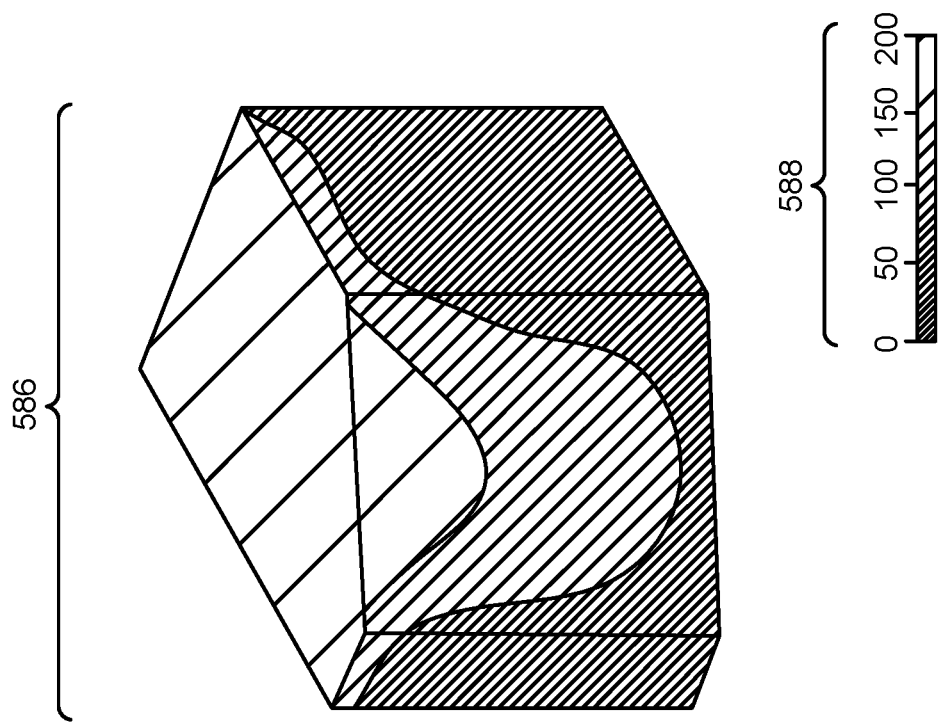
FIG. 5 is a simplified perspective view of an example of visualizations of simulation results in accordance with some examples of the techniques described herein.
Figure 5:
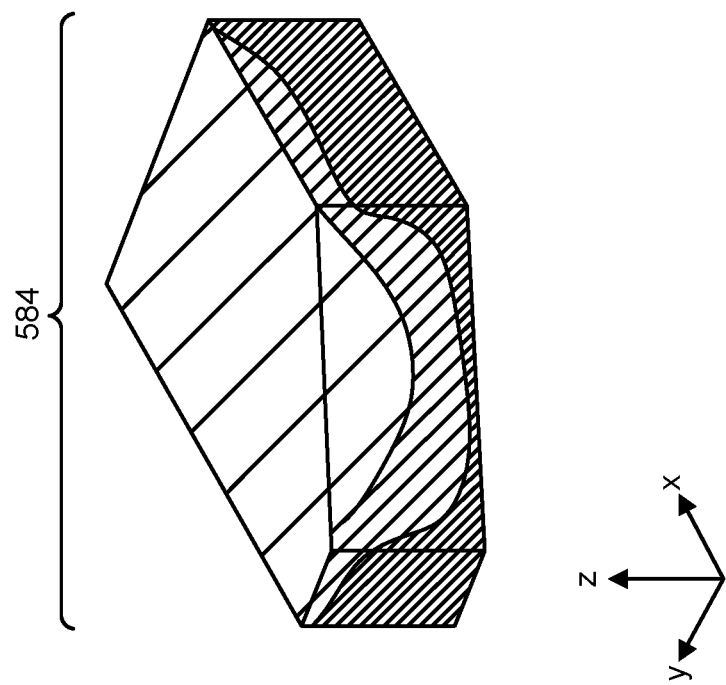

FIG. 5 is a simplified perspective view of an example of visualizations 584, 586 of simulation results in accordance with some examples of the techniques described herein. Some examples of the simulation described herein include a simulation of a transient manufacturing (e.g., printing) procedure. The simulation may produce a transient temperature history for each voxel as simulation results. The visualizations 584, 586 are simplified temperature maps corresponding to a build volume at different times. For example, the first visualization 584 illustrates simulation results of 3D manufacturing at a first time, and the second visualization 586 illustrates simulation results of the 3D manufacturing at a second later time. Both of the visualizations 584, 586 include cutaways to illustrate internal temperatures (e.g., buried layers). In this example, the temperatures are illustrated on a simplified scale in degrees Fahrenheit 588. Other examples may be presented on a color gradient scale to show finer temperature variation than the example in FIG. 5.

In some examples, visualizations of simulation results may be presented on a display and/or simulation results may be sent to another device (e.g., computing device, monitor, etc.) to present visualizations of simulation results. In the example illustrated in FIG. 5, the simulation reflects manufacturing where objects are built up layer by layer.

Some examples of the techniques described herein may provide simulation that accounts for current (e.g., up-to-the-moment) ground truth and that can continuously adapt to situational change. Adapting the simulation may enable simulation to be utilized beyond offline prediction. In some examples, adapting simulation may allow the simulation to be applied for operational applications since the quantitative results may be accurate and up to the moment. For example, some approaches may treat k, h, and T∞ of Equation (1) as predetermined constants. A benefit of some examples of the techniques described herein include an ability to adapt to the situational change. For example, airflow may surround the build volume and/or ambient temperature may vary from time to time reflecting the environmental change. Using constant values (e.g., constant h, T∞) cannot reflect such change and may guide a simulation to deviate from the ground truth. Some examples of the techniques described herein may use point thermal sensors' time series measurements to adjust boundary condition parameters (e.g., h and/or T∞) to help keep a simulation in line with the production reality.

Figure 6B:
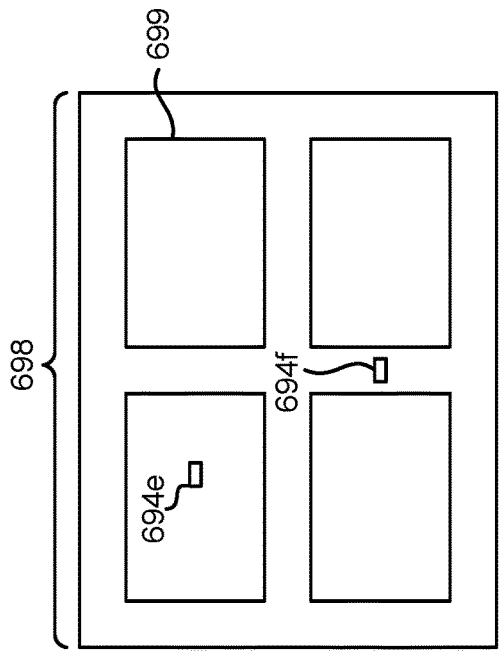
FIG. 6B is a diagram illustrating an example of a bottom barrier of the build volume.
Figure 6A:
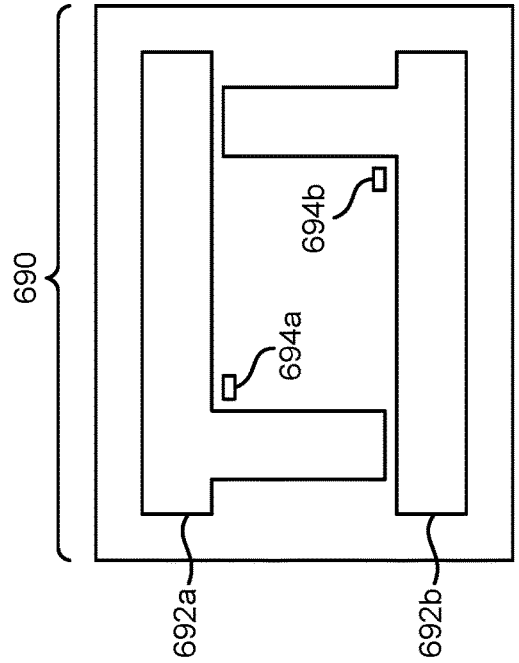
FIG. 6A is a diagram illustrating an example of a build volume.

FIG. 6A is a diagram illustrating an example of a build volume 602. The build volume 602 described in connection with FIG. 6A may be an example of the build volume 102 described in connection with FIG. 1.

Figure 6D:
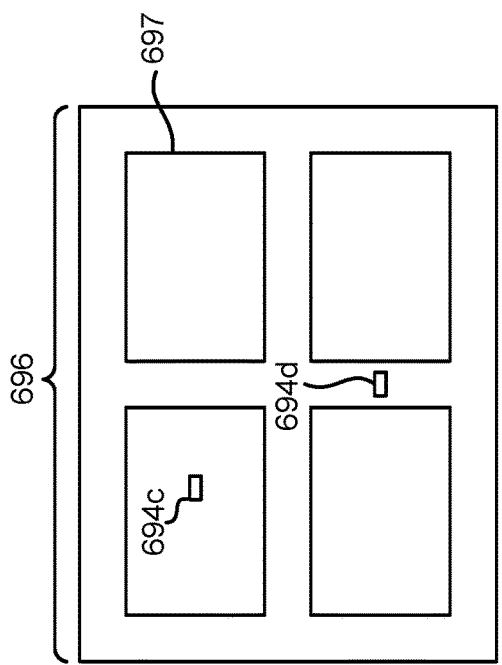
FIG. 6D is a diagram illustrating an example of a side barrier of the build volume.
Figure 6C:
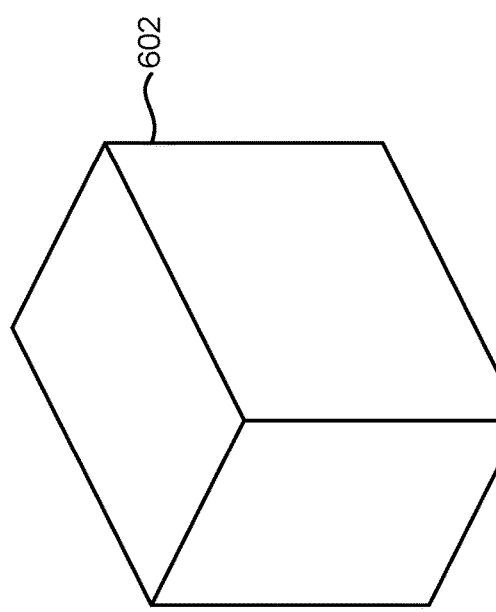
FIG. 6C is a diagram illustrating an example of a side barrier of the build volume.

FIG. 6B is a diagram illustrating an example of a bottom barrier 690 of the build volume 602. FIG. 6C is a diagram illustrating an example of a side barrier 696 of the build volume 602. FIG. 6D is a diagram illustrating an example of a side barrier 698 of the build volume 602. FIGS. 6A-D will be described together.

In this example, the bottom barrier 690 includes heaters 692a-b and thermal sensors 694a-b. The side barrier 696 may be an example of a left or right side barrier of the build volume 602. The side barrier 696 includes four heating zones 697 and two thermal sensors 694c-d. The side barrier 698 may be an example of a front or back side barrier of the build volume 602. The side barrier 698 includes four heating zones 699 and two thermal sensors 694e-f.

In some examples, temperature at 5 barriers 690, 696, 698 (four side barriers 696, 698 and a bottom barrier 690) may be actively managed using point thermal sensors 694a-f and heaters (e.g., heaters 692a-b and heaters in the heating zones 697, 699). Each barrier may have two thermal sensors 694 that may be utilized to monitor and report out temperatures. These temperatures may be used to determine when to activate or deactivate heaters (e.g., heaters 692a-b and heaters in the heating zones 697, 699) mounted on each barrier 690, 696, 698 to maintain a temperature. For example, if sensed temperatures are lower than target temperatures, heaters (e.g., heaters 692a-b and heaters in the heating zones 697, 699) may be activated. For example, each heater (e.g., heaters 692a-b and heaters in the heating zones 697, 699) may be a pulse width modulated (PWM) heater. Sensed temperatures may be reported periodically (e.g., every few seconds, such as at a 5 second interval). As described herein, measurements or sensed temperatures from the thermal sensors 694a-f may be utilized to adapt a boundary condition of a simulation. The simulation or part of the simulation may be computed during production of an object or objects in the build volume 602.

While various examples of systems and methods are described herein, the systems and methods are not limited to the examples. Variations of the examples described herein may be implemented within the scope of the disclosure. For example, operations, functions, aspects, or elements of the examples described herein may be omitted or combined.

The invention claimed is:

1. A method comprising:
receiving a sensed temperature from at least one thermal sensor corresponding to a point on a build enclosure;
storing the sensed temperature from the at least one thermal sensor;
simulating three-dimensional (3D) manufacturing for a first time range to produce a simulated temperature;
adapting a boundary condition of the simulation of the 3D manufacturing based on the sensed temperature received from the at least one thermal sensor at the point on the build enclosure;
determining a temperature difference between the simulated temperature and the sensed temperature from the at least one thermal sensor; and
adjusting, based on the temperature difference, the boundary condition to simulate the 3D manufacturing for a second time.

2. The method of claim 1, wherein the temperature difference is greater than a threshold.

3. The method of claim 1, further comprising determining a fitted function based on a set of sensed temperatures and a set of simulated temperatures.

4. The method of claim 3, wherein determining the fitted function comprises weighting the set of sensed temperatures based on age.

5. The method of claim 3, wherein determining the fitted function is based on a regression, kernel-based fitting, or machine learning.

6. The method of claim 3, wherein adapting the boundary condition comprises determining an estimated adjustment based on the fitted function.

7. The method of claim 6, wherein adapting the boundary condition comprises applying a damping parameter to the estimated adjustment.

8. The method of claim 6, wherein adapting the boundary condition comprises applying the estimated adjustment to the boundary condition.

9. A three-dimensional (3D) printing device, comprising:
a thermal sensor corresponding to a barrier of a build volume, wherein the thermal sensor is configured to sense a sensed temperature at a point on the barrier of the build volume; and
a controller, wherein the controller is configured to:
simulate three-dimensional (3D) manufacturing for a first time range to produce a simulated temperature;
determine a temperature difference between the simulated temperature and the sensed temperature from the thermal sensor; and
adjust, based on the temperature difference, a boundary condition to simulate 3D manufacturing for a second time range.

10. The 3D printing device of claim 9, wherein the controller is to interpolate sensed temperatures in the first time range to produce the sensed temperature.

11. The 3D printing device of claim 9, further comprising a second thermal sensor corresponding to the barrier of the build volume, wherein the controller is to average sensed temperatures from the thermal sensor and the second thermal sensor to produce the sensed temperature.

12. A non-transitory tangible computer-readable medium storing executable code, the executable code comprising:
code to cause a processor to obtain a set of sensed temperatures from a thermal sensor corresponding to a point on a build enclosure;
code to cause the processor to fit a function based on the set of sensed temperatures from the thermal sensor corresponding to the point on the build enclosure, a set of simulated temperatures, and a set of boundary conditions to determine a normalized temperature difference between the set of simulated temperatures and the set of sensed temperatures;
code to cause the processor to calculate an adjustment value based on the function;
code to cause the processor to determine an adapted boundary condition based on the adjustment value; and
code to cause the processor to simulate 3D manufacturing based on the adapted boundary condition for a subsequent time range.

13. The non-transitory tangible computer-readable medium of claim 12, wherein the code to cause the processor to determine the adapted boundary condition comprises code to cause the processor to apply a damping parameter to the adjustment value to determine the adapted boundary condition.

* * * * *